US010864546B2

(12) United States Patent
Kim et al.

(10) Patent No.: US 10,864,546 B2
(45) Date of Patent: Dec. 15, 2020

(54) SYSTEM FOR COATING HEAT TRANSFER TUBE FOR CONDENSER

(71) Applicant: DOOSAN HEAVY INDUSTRIES & CONSTRUCTION CO., LTD., Changwon-si, Gyeongsangnam-do (KR)

(72) Inventors: Jin Bum Kim, Changwon-si (KR); Hyun Sik Kim, Changwon-si (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 0 days.

(21) Appl. No.: 16/151,527

(22) Filed: Oct. 4, 2018

(65) Prior Publication Data

US 2019/0030561 A1 Jan. 31, 2019

Related U.S. Application Data

(63) Continuation of application No. 15/647,164, filed on Jul. 11, 2017, now Pat. No. 10,155,245.

(30) Foreign Application Priority Data

Jul. 12, 2016 (KR) .................. 10-2016-0088105

(51) Int. Cl.
*B05C 11/10* (2006.01)
*B05B 14/00* (2018.01)
(Continued)

(52) U.S. Cl.
CPC ...... *B05C 11/1039* (2013.01); *B05B 13/0214* (2013.01); *B05B 13/041* (2013.01); *B05B 13/0436* (2013.01); *B05B 14/00* (2018.02); *B05C 11/021* (2013.01); *B05C 11/08* (2013.01); *B23P 15/26* (2013.01); *F28F 13/18* (2013.01); *B05B 1/20* (2013.01); *F28F 19/02* (2013.01); *F28F 19/04* (2013.01); *F28F 2245/04* (2013.01); *Y02P 70/10* (2015.11)

(58) Field of Classification Search
USPC ................... 118/307, 313–315, 325
See application file for complete search history.

(56) References Cited

U.S. PATENT DOCUMENTS

| 1,941,002 A * | 12/1933 | Harrison ............... B65H 81/08 15/88 |
| 7,958,840 B2 * | 6/2011 | Chappa ............... B05B 13/0228 118/304 |
| 2013/0233350 A1 * | 9/2013 | Tomkins ............... B08B 9/023 134/12 |

FOREIGN PATENT DOCUMENTS

| JP | 2001276688 A | * 10/2001 | ............ B05B 14/00 |
| KR | 20080025915 A | * 3/2008 | |

OTHER PUBLICATIONS

English Translation JP2001276688A (Year: 2001).*
English Translation KR20080025915A (Year: 2008).*

* cited by examiner

*Primary Examiner* — Yewebdar T Tadesse
(74) *Attorney, Agent, or Firm* — Invenstone Patent, LLC

(57) ABSTRACT

A system for coating a heat transfer tube for a condenser is disclosed. The system simplifies a process of coating the heat transfer tube, and is able to uniformly coat a plurality of heat transfer tubes. In addition, the system is economically feasible in that coating solution can be reused by collecting and circulating it. Due to super-hydrophobic coating, the size of a droplet condensed on the surfaces of the heat transfer tubes coated by the system can be reduced, and a condensation heat transfer coefficient can be increased.

9 Claims, 5 Drawing Sheets

(51) Int. Cl.
B05B 13/02 (2006.01)
B23P 15/26 (2006.01)
F28F 13/18 (2006.01)
B05B 13/04 (2006.01)
B05C 11/02 (2006.01)
B05C 11/08 (2006.01)
*B05B 1/20* (2006.01)
*F28F 19/02* (2006.01)
*F28F 19/04* (2006.01)

[FIG. 1]
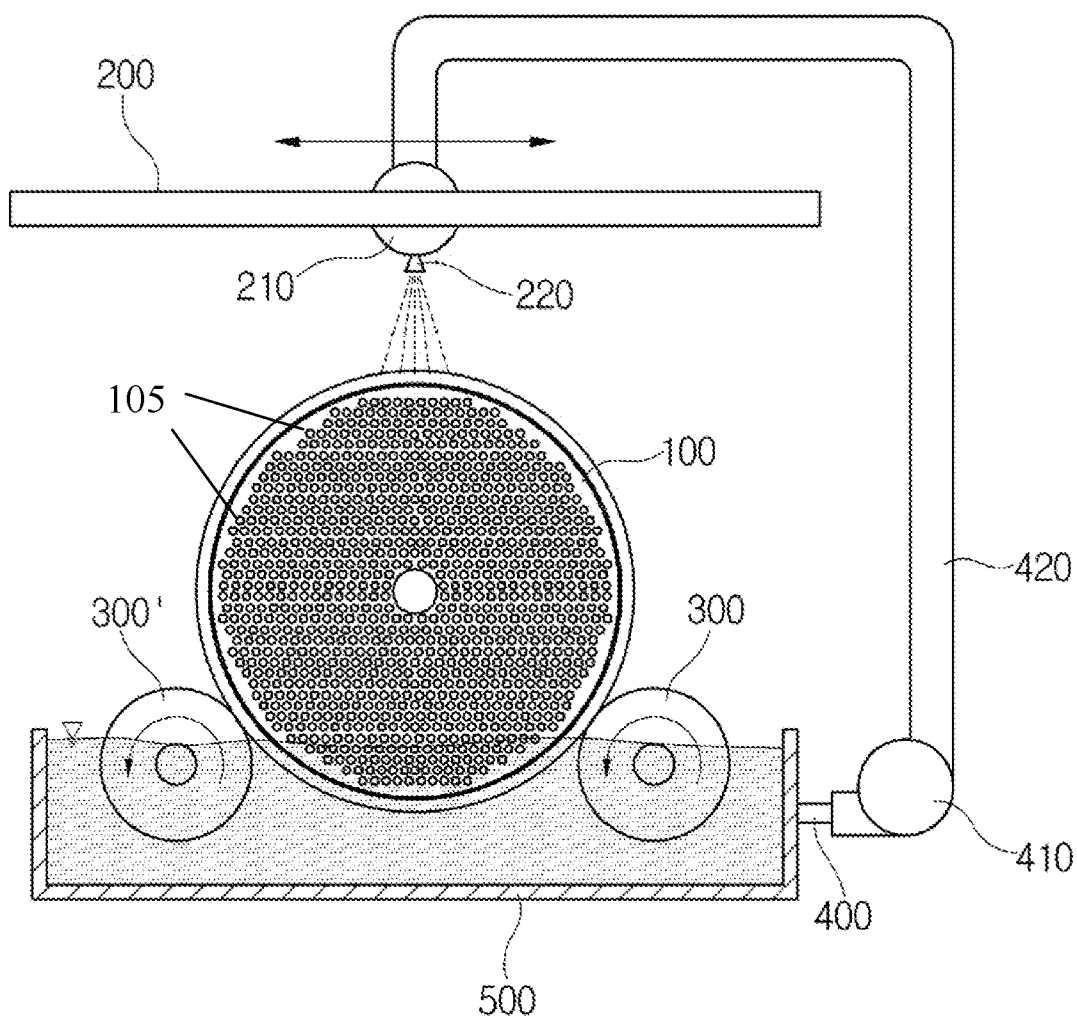

[FIG. 2]
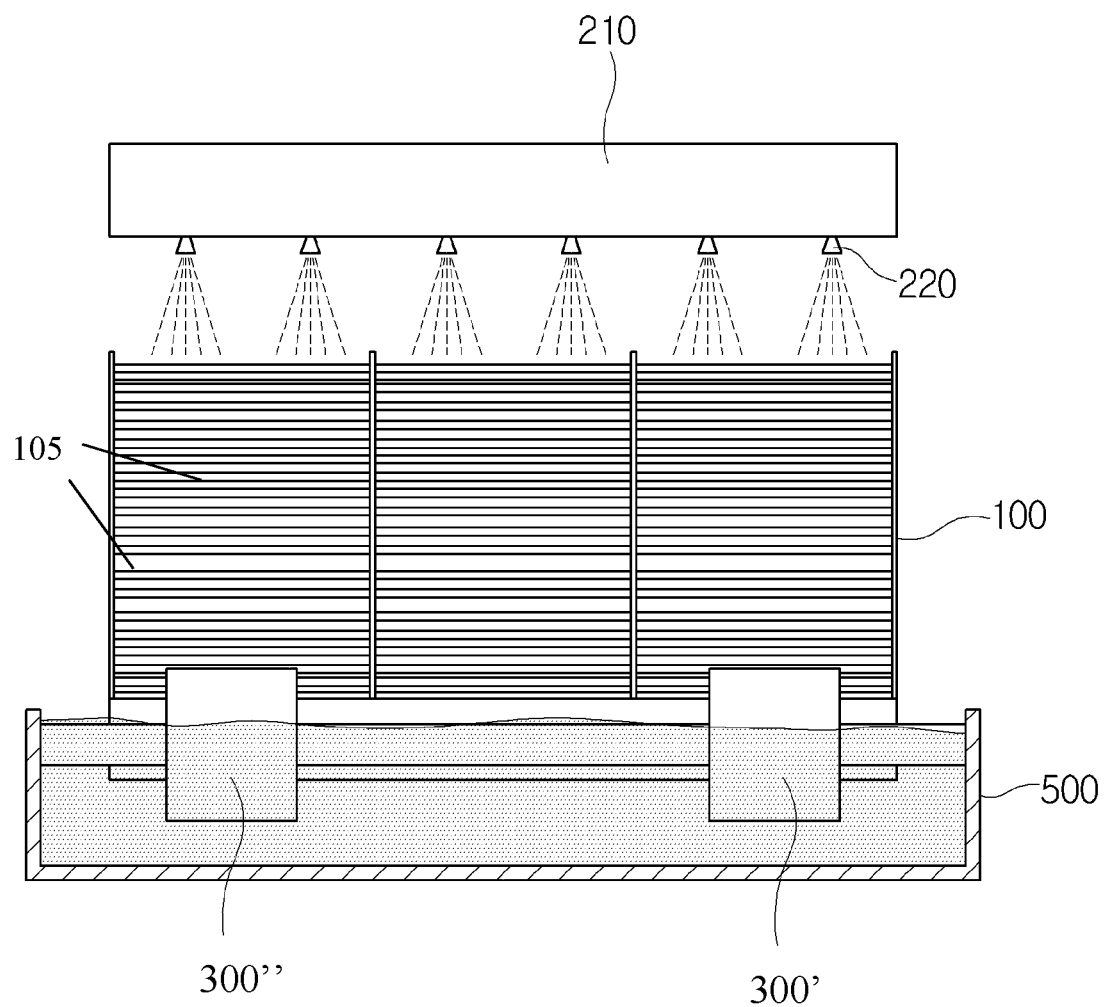

[FIG. 3]
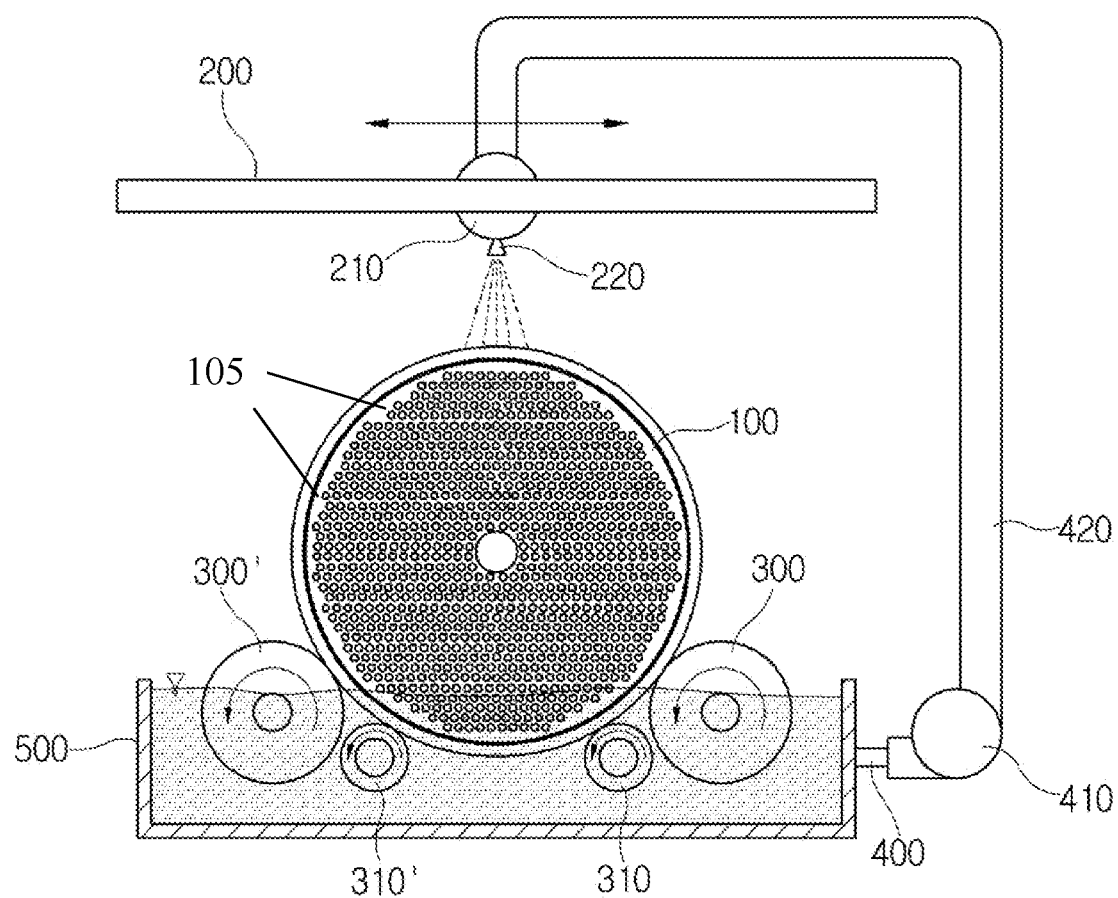

[FIG. 4]
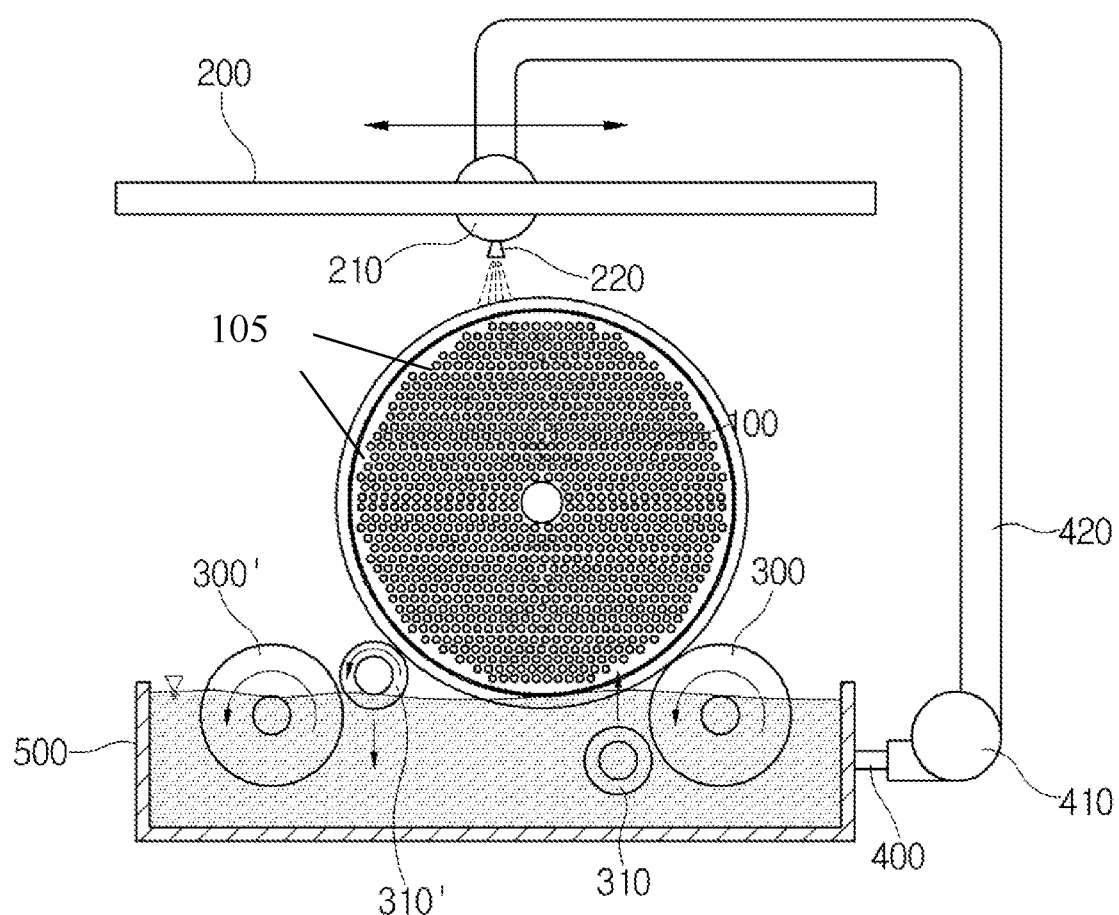

[FIG. 5]
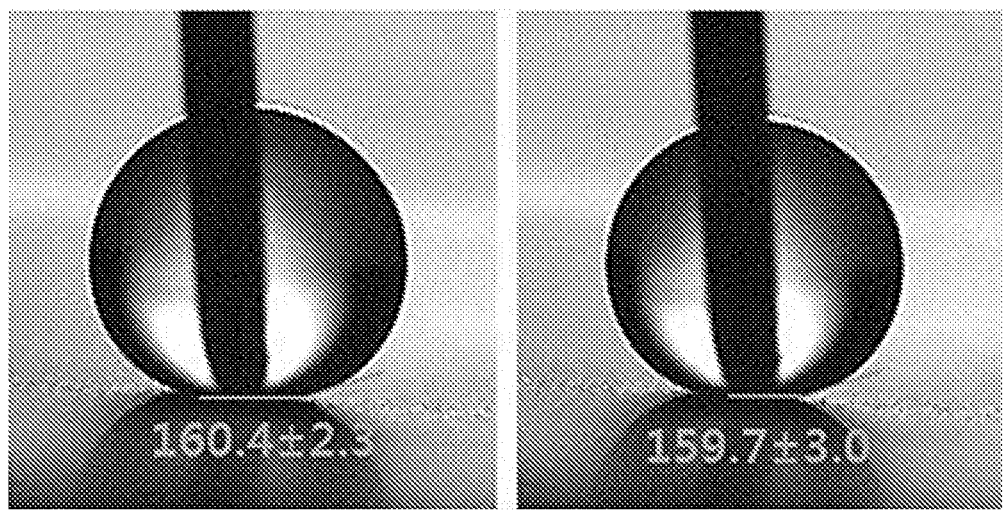
[FIG. 6]
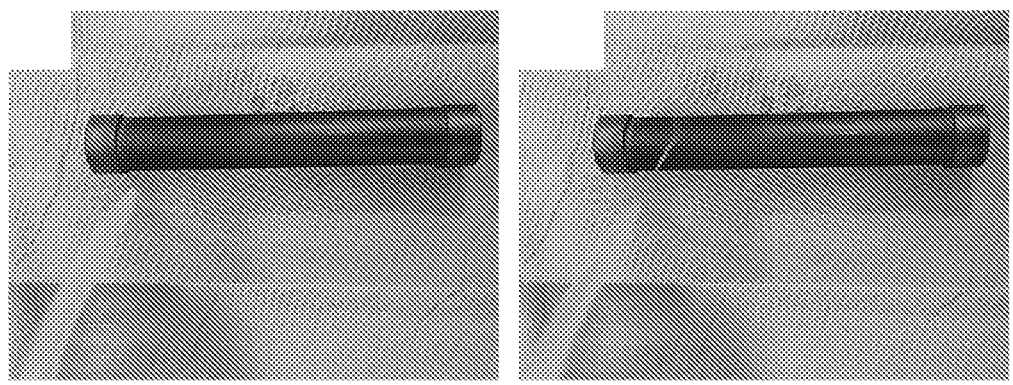

SYSTEM FOR COATING HEAT TRANSFER TUBE FOR CONDENSER

CROSS-REFERENCE TO RELATED APPLICATIONS

This application is a continuation of U.S. application Ser. No. 15/647,164, filed on Jul. 11, 2017, which claims priority to Korean Patent Application No. 10-2016-0088105, filed on Jul. 12, 2016, the disclosure of which is incorporated herein by reference in its entirety.

BACKGROUND

In a nuclear power plant or thermoelectric power plant, uranium, petroleum, coal, or the like is used as fuel to generate heat, and the generated heat is used to heat water circulating through a system and generate steam. The generated steam rotates a turbine, thus producing electricity. The steam that has passed through the turbine is cooled by a condenser and changed to water again. Particularly, in a steam circulation power generation method, a water-cooling condensation process using water requires a large amount of cooling water. Given this, seawater is used as cooling water to be used in the condenser. Therefore, to smoothly supply seawater to be used as cooling water and discharge the used seawater, a power plant using the steam circulation power generation method is generally installed near the shore.

The condenser, which is a container provided to return steam to water again, is configured such that seawater continuously flows through a heat transfer tube of the condenser so as to continuously reduce the temperature of an inner wall of the condenser. Then, steam, which has come out of a valve and thus been used to rotate the turbine, directly collides with the inner wall of the condenser and, simultaneously, is cooled and condensed, thus returning to water. The condensed water returns to a boiler pipe again and then is heated to form steam of approximately 500° C. The heated steam is supplied to the turbine through the valve again.

In the boiler, hot water is changed to supersaturated steam, and the steam is discharged to the turbine through the valve. In the condenser, the steam is rapidly cooled and returned to water. This process is continuously repeated.

Here, to cool the outer wall of the condenser, much larger amount of cooling water than the amount of cooling water required to cool typical mechanical frictional heat is needed. Hence, while a power generator is operated, seawater must be continuously supplied.

With regard to the condenser, steam which has been used to rotate the turbine comes into contact with the inner wall of the condenser, and thus is cooled and returned to water. To increase the amount of steam coming into contact with the inner wall of the condenser, the condenser is formed of a plurality of heat transfer tubes so as to increase a contact area.

The condenser is problematic in that the outer surfaces of the heat transfer tubes may be corroded by condensation, or corrosion or the like of the heat transfer tubes may be caused by condensed fluid remaining on the surfaces.

In an effort to overcome the foregoing problems, a method of coating a heat transfer tube with fluoroplastic was proposed in Korean Patent Unexamined Publication No. 10-2000-0074647. This method includes an operation of simply spraying coating solution onto the surface of the heat transfer, and a sintering operation. However, several thousands of heat transfer tubes are needed in a condenser. Hence, if the several thousands of heat transfer tubes are coated by a simple spray method, the outer surfaces of the heat transfer tubes cannot be uniformly coated. There was proposed another coating method, in which heat transfer tubes are manufactured into a cylindrical bundle, and the cylindrical bundle is immersed in coating solution. However, because the cylindrical bundle floats due to buoyancy during the immersion operation, it is not easy to perform the coating process. In addition, coating solution may enter even the internal space of the heat transfer tubes. Furthermore, if the cylindrical bundle is assembled after the heat transfer tubes are coated one by one, there are problems in that a manufacturing process is complex, and the outer surfaces of the heat transfer tubes may be damaged. In the case of the conventional art, heat transfer tubes are coated one by one and then assembled into a cylindrical bundle. However, the conventional art has serious problems in that a coating process and a bundle assembly process are complex, and the surfaces of the heat transfer tubes may be damaged during the assembly process.

Therefore, it is urgent to develop a coating system capable of efficiently and uniformly coating the heat transfer tubes of the condenser.

BRIEF SUMMARY

The present disclosure relates to a system for coating a heat transfer tube for a condenser.

An object of the present disclosure is to provide a system for coating a heat transfer tube for a condenser which is capable of efficiently and uniformly coating a plurality of heat transfer tubes of a cylindrical bundle after the heat transfer tubes have been manufactured into the cylindrical bundle.

Another object of the present disclosure is to provide a system for coating a heat transfer tube for a condenser which is capable of uniformly coat the surfaces of a large number of heat transfer tubes in a super-hydrophobic coating manner, thus reducing the size of a condensed droplet, thereby increasing a condensation heat transfer coefficient.

Yet another object of the present disclosure is to provide a system for coating a heat transfer tube for a condenser which can prevent coating solution from penetrating into the internal space of the heat transfer tubes, prevent the outer surfaces of the coated heat transfer tubes from being damaged, and prevent the amount of coating solution used from being excessively increased.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

The present disclosure may be embodied in many different forms and should not be construed as limited to the embodiments set forth herein. Rather, these embodiments are provided so that this disclosure will be thorough and complete, and will fully convey the scope of the present disclosure to one of ordinary skill in the art.

In the drawings, thicknesses or sizes of layers are exaggerated for convenience of explanation and clarity, and the same reference numerals denote the same elements. As used herein, the term "and/or" includes any and all combinations of one or more of the associated listed items.

The terminology used herein is for the purpose of describing particular embodiments only and is not intended to be limiting of exemplary embodiments of the present disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

In accordance with one aspect of the present disclosure, a system for coating a surface of a heat transfer tube for a condenser, the heat transfer tube comprising a cylindrical bundle including a plurality of heat transfer tubes, may include: a spray unit disposed at a position spaced apart from an outer circumferential surface of the cylindrical bundle and provided to supply coating solution to the cylindrical bundle; one or more spray nozzle units coupled with the spray unit and configured to coat outer circumferential surfaces of the heat transfer tubes of the cylindrical bundle; a recovery unit configured to collect coating solution flowing downward after the coating solution is sprayed from the spray nozzle units and used to coat the outer circumferential surfaces of the heat transfer tubes therewith; a circulation unit coupled with the recovery unit and the spray unit and configured to supply coating solution stored in the recovery unit to the spray unit; and first and second rotating units provided to support and rotate the cylindrical bundle.

In detail, the present disclosure relates to a system for coating a surface of a heat transfer tube for a condenser. The heat transfer tube may be a cylindrical bundle including a plurality of heat transfer tubes. The heat transfer tubes may perform heat exchange on the outer surfaces thereof and be provided as a measure for increasing a surface area for heat exchange. The heat transfer tube may be formed of a cylindrical bundle including a plurality of heat transfer tubes, rather than being formed of a single heat transfer tube. Thereby, the contact area of the heat transfer tube can be increased, and heat exchange performance of the heat transfer tube can be enhanced.

Typically, the surfaces of the heat transfer tubes are coated so as to prevent surface corrosion. However, as described above, if the cylindrical bundle is formed of a plurality of heat transfer tubes so as to enhance heat exchange efficiency, there is a problem in that it is not easy to uniformly coat the surfaces of the plurality of heat transfer tubes. That is, if the heat transfer tubes are coated one by one and the coated heat transfer tubes are manufactured into a cylindrical bundle, the coating process and the bundle manufacturing process are complex, and there is a serious problem in that the surfaces of the heat transfer tubes may be damaged during the bundle assembly process. Furthermore, the conventional method in which a cylindrical bundle is manufactured using a plurality of heat transfer tubes and thereafter immersed in coating solution to coat the heat transfer tubes is problematic in that it is difficult to uniformly coat heat transfer tubes disposed in a central portion of the cylindrical bundle, and coating solution may penetrate into the internal space of the heat transfer tubes when they are immersed in the coating solution. That is, it is preferable that the inner surfaces of the heat transfer tubes be coated to have hydrophile property and the outer surfaces thereof be coated to have hydrophobic property. However, the conventional technique is problematic in that hydrophobic coating solution to be used for external coating may penetrate into the internal space of the heat transfer tubes whereby the inner surfaces thereof may also be coated with hydrophobic coating solution. Furthermore, because the cylindrical bundle floats due to buoyancy during the immersion operation, it is not easy to perform the coating process, and an excessive amount of coating solution is required. The spray coating method has an advantage in that the amount of coating solution used can be reduced, compared to that of the immersion coating method. However, the spray coating method is problematic in that inner and outer portions of the cylindrical bundle may not be uniformly coated.

However, in the case where the system according to the present disclosure is used to coat heat transfer tubes, a plurality of heat transfer tubes are manufactured into a cylindrical bundle, and then the heat transfer tubes are coated by a coating solution spray system. After the spray operation is performed, coating solution flowing downward from the heat transfer tubes is collected and stored in a recovery unit and then supplied to a spry unit again by a circulation unit. Therefore, it is possible to reuse the coating solution. Furthermore, because the cylindrical bundle is rotated by a rotating unit, all of the heat transfer tubes disposed in the inner and outer portions of the cylindrical bundle can be uniformly coated. Consequently, the system for coating the heat transfer tube for the condenser according to the present disclosure can simplify a process of coating a plurality of heat transfer tubes, and uniformly coat the plurality of heat transfer tubes. Furthermore, the system according to the present disclosure is economically feasible in that coating solution can be reused by collecting and circulating it.

In an embodiment of the present disclosure, the first and second rotating units may support a lower portion of each of longitudinal opposite ends of the cylindrical bundle at two points, and may rotate in a same direction. The first and second rotating units may function to support the cylindrical bundle. As the first and second rotating units rotate in the same direction, the cylindrical bundle including the heat transfer tubes may also rotate in the same direction and at a constant speed. In the case of the conventional spray method, it is easy to coat the surfaces of heat transfer tubes disposed in the outer portion of the cylindrical bundle, but it is difficult to coat the surfaces of heat transfer tubes disposed in the central portion of the cylindrical bundle. On the other hand, in the present disclosure, the cylindrical bundle is continuously rotated by the first and second rotating units, and coating solution sprayed by the spray method can flow from the outer portion of the cylindrical bundle into the central portion thereof. Therefore, the heat transfer tubes disposed in the central portion of the cylindrical bundle can be uniformly coated, by the rotation of the cylindrical bundle, with coating solution which has flowed into the central portion of the cylindrical bundle. To support the cylindrical bundle, the first and second rotating units support the lower portions of the longitudinal opposite ends of the cylindrical bundle. In the embodiment, the first and second rotating units are disposed in the longitudinal opposite ends of the cylindrical bundle, but the present disclosure is not limited to this embodiment, and an additional rotating unit may be provided as needed.

In an embodiment of the present disclosure, the circulation unit may include: a first connection pipe coupled to the recovery unit; a second connection pipe coupled with the spray unit; and a circulation pump configured to circulate coating solution at a predetermined pressure. The circulation pump may be coupled with the first connection pipe and the second connection pipe. If coating solution sprayed by the spray nozzle units flows downward from the surfaces of the heat transfer tubes, it is collected in the recovery unit.

Coating solution collected in the recovery unit is moved to the spray unit by the circulation unit. The circulation unit may include the first and second connection pipes configured to couple the recovery unit with the spray unit, and the circulation pump configured to supply coating solution to the spray unit at a predetermined pressure. In detail, the recovery unit may be coupled with the first connection pipe, and one end of the first connection pipe that is not coupled to the recovery unit may be coupled with the circulation pump. The spray unit may be coupled with the second connection pipe, and one end of the second connection pipe that is not coupled with the spray unit may be coupled to the circulation pump. Coating solution of the recovery unit may be moved to the first connection pipe by the operation of the circulation pump, and then supplied to the spray unit via the second connection pipe at a predetermined pressure.

In an embodiment of the present disclosure, the spray unit may be provided in a form of a linear bar configured in a longitudinal direction of the cylindrical bundle. The spray unit may move in a horizontal direction parallel to the cylindrical bundle so as to coat the cylindrical bundle. The horizontal movement of the spray unit may be performed by a moving unit provided in the spray unit. The spray unit may store coating solution and spray the stored coating solution through the spray nozzle units. In detail, the spray unit may be provided in the form of a linear bar, configured in the longitudinal direction of the cylindrical bundle. The spray nozzle units may be coupled to the lower portion of the linear-bar-shaped spray unit at positions spaced apart from each other by regular distances. The spray unit may include a plurality of spray units and be movable in the horizontal direction parallel to the cylindrical bundle. As shown in the embodiment of the present disclosure, the spray unit may have a linear bar shape. Alternatively, the spray unit may have a rectangular plate shape oriented in the horizontal direction parallel to the cylindrical bundle. However, in the case where the spray unit has a rectangular plate shape, the number of spray nozzle units is increased compared to that of the linear-bar-shaped spray unit. If the number of spray nozzle units is increased, an excessive amount of coating solution may be used because coating solution is sprayed from the plurality of spray nozzle units. Therefore, in the present disclosure, the linear-bar-shaped spray unit provided with the spray nozzle units is used to spray coating solution and configured so as to be movable in the horizontal direction of the cylindrical bundle. While the spray unit horizontally reciprocates at a predetermined speed, coating solution is sprayed from the spray nozzle units. In this way, the amount of coating solution sprayed can be controlled, and the efficiency of the operation of coating the cylindrical bundle can be enhanced.

In an embodiment of the present disclosure, the system may further include a first movable rotating unit and a second movable rotating unit. The first and second rotating units are stationary rotating units, which are fixed in location although they rotate in the same direction. On the other hand, the first and second movable rotating units can move in the same direction, and each can independently move. The first and second movable rotating units may be disposed between the first and second rotating units and support a lower portion of each of the longitudinal opposite ends of the cylindrical bundle at two points. The first and second rotating units may be disposed under the longitudinal opposite ends of the cylindrical bundle, thus supporting the cylindrical bundle. In addition, the system further may include first and second movable rotating units which can support the cylindrical bundle at a position lower than the first and second rotating units. That is, the first movable rotating unit and the second movable rotating unit may be independent rotating units which are disposed between the first and second rotating units and located lower than the first and second rotating units.

Furthermore, each of the first movable rotating unit and the second movable rotating unit may move in the vertical direction perpendicular to the cylindrical bundle. The vertical movement of each of the first movable rotating unit and the second movable rotating unit may be performed by a vertical moving unit provided in the recovery unit. The first movable rotating unit and the second movable rotating unit may rotate in the same direction as that of the first and second rotating units and fundamentally function to rotate and support the cylindrical bundle. In the case where one side of the cylindrical bundle is vertically moved as a measure for efficiently performing the operation of coating the central portion of the cylindrical bundle, the cylindrical bundle may be rotated in a slightly tilted state. In this case, coating solution can flow in the tilted direction, whereby the efficiency of the operation of coating the heat transfer tubes can be enhanced, compared to that before the cylindrical bundle is tilted. In more detail, when the first movable rotating unit is moved toward an upper end of the vertical moving unit, the second movable rotating unit may not be moved. In this state, when the second movable rotating unit is moved toward the upper end of the vertical moving unit, the first movable rotating unit may be moved toward a lower end of the vertical moving unit again. As such, the cylindrical bundle which is rotating may be moved upward or downward by the intersecting movement of the first and second movable rotating units. The outer surfaces of the heat transfer tubes can be uniformly coated by such movement of the first and second movable rotating units.

In an embodiment, the coating solution may include a silane compound and an organic solvent. The coating solution may include the silane compound and the organic solvent at a weight ratio of 1:900 to 1:1100, and preferably, at a weight ratio of 1:1000. The silane compound may be formed of at least one selected from the group consisting of perfluorodecyltrimethoxysilane, triethoxyoctylsilane, perfluorodecyltrichlorosilane, and perfluorodecyltriethoxysilane, but the present disclosure is not limited to this embodiment. The organic solvent may be formed of at least one selected from the group consisting of methanol, ethanol, propanol, hexane, heptane, and cyclohexane, but the present disclosure is not limited to this embodiment. More preferably, the coating solution may include Perfluorodecyltrichlorosilane and hexane, but the present disclosure is not limited to this.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a sectional view illustrating a system for coating a heat transfer tube for a condenser according to the present disclosure;

FIG. 2 is a side view illustrating a system for coating the heat transfer tube for the condenser according to the present disclosure;

FIG. 3 is a sectional view illustrating additional first and second movable rotating units included in the a system for coating the heat transfer tube for the condenser according to the present disclosure;

FIG. 4 is a sectional view illustrating vertical movement of the first and second movable rotating units;

FIG. 5 is a collection of photographs showing a contact angle measured after an operation of coating the surface of the heat transfer tube for the condenser has been performed; and FIG. 6 is a collection of photographs showing that water is not formed on the surface of the heat transfer tube after the coating operation has been performed.

DETAILED DESCRIPTION

Hereinafter, embodiments of the present disclosure for a system for coating heat transfer tubes of a condenser will be described in detail with reference to the accompanying drawings. These embodiments are only intended to describe the present disclosure in further detail, and it will be apparent to a person having ordinary knowledge in the art that the scope of the present disclosure is not limited to these embodiments.

A system for coating a heat transfer tube for a condenser in accordance with an embodiment of the present disclosure will be described with reference to FIGS. 1 and 2.

The system for coating the heat transfer tube for the condenser in accordance with the embodiment of the present disclosure may generally include: a moving unit 200; a spray unit 210; one or more spray nozzle units 220; a first rotating unit 300; a second rotating unit 300'; a recovery unit 500; and a circulation unit including a first connection pipe 400, a circulation pump 410, and a second connection pipe 420.

The present disclosure relates to the system for coating, at substantially the same time, a plurality of heat transfer tubes 105 that is assembled into a cylindrical bundle 100. Specifically, the plurality of heat transfer tubes 105 are assembled into the cylindrical bundle 100 and then coated by spraying a coating solution onto the cylindrical bundle 100. Compared to the method in which each of the heat transfer tubes 105 is individually coated, the heat transfer tubes 105 can be uniformly coated, and the process can be simplified. In addition, the surfaces of the heat transfer tubes 105 can be prevented or reduced from being damaged after they are coated with the coating solution.

The spray unit 210 is coupled with the spray nozzle units 220 and performs a coating operation in such a way that the coating solution in the spray unit 210 is sprayed through the spray nozzle units 220. The spraying method is the same as that of a shower. For example, in a shower, water is sprayed at a pressure of up to approximately 1 bar. However, in the case of the present disclosure and in contrast to a typical shower, the coating solution flows and remains on the surfaces of the heat transfer tubes 105. Therefore, the coating solution is preferably sprayed at a pressure ranging from 0.1 bar to 0.7 bar. In a particular embodiment, the coating solution is sprayed at a pressure ranging from 0.3 bar to 0.5 bar. The range of pressure by which the coating solution is sprayed is not limiting. If the pressure at which coating solution is sprayed is lower than 0.1 bar, there is a problem in that the time it takes to coat the heat transfer tubes 105 is excessively increased because the spraying speed is very low. If the pressure exceeds 0.7 bar, there is a problem in that the time required for coating solution to flow and remain on the surfaces of the heat transfer tubes is excessively reduced.

In view of FIG. 2, The spray unit 210 has a linear bar shape, extending in a longitudinal direction of the cylindrical bundle 100. The spray nozzle units 220 are coupled to the spray unit 210, which may have a linear bar shape, at positions spaced apart from each other by regular distances. Since the coating solution has relatively low surface tension, it is possible to uniformly spray the coating solution onto the surfaces of the heat transfer tubes 105 within the cylindrical bundle 100. However, there may be a phenomenon in which coating solution is driven to one side while it flows toward the inside of the cylindrical bundle. To reduce or avoid the foregoing problem, it is preferable that the distance between individual spray nozzle units of the spray nozzle units 220 range from 0.4 m to 0.6 m. If the distance between the individual spray nozzle units 220 is less than 0.4 m, there is a problem in that coating solution sprayed from different spray nozzle units 220 may overlap each other because the distance between the spray nozzle units 220 is very short. If the distance exceeds 0.6 m, there is a problem in that the surfaces of the heat transfer tubes 105 may not be uniformly coated with coating solution because the distance between the spray nozzle units 220 is excessively long. In other words, the coating solution may not be applied to some portions of the heat transfer tubes 105 because of the excessively long distance between the spray nozzle units 220. In an embodiment, the first and second movable rotating units 310 and 310' may be used to uniformly coat the entire surfaces of the heat transfer tubes 105.

The spray unit 210 is coupled to the moving unit 200. Referring to FIG. 1, the spray unit 210 can be moved by the moving unit 200 in a horizontal direction parallel to the cylindrical bundle 100. The moving unit 200 includes an actuator for making it possible for the spray unit 210 to move in the horizontal direction. The horizontal movement of the spray unit 210 may be realized by the operation of the actuator.

The recovery unit 500 functions to collect coating solution when the coating solution flows down from the cylindrical bundle 100. The recovery unit 500 has a hexahedral shape, and the length and width thereof are respectively greater than those of the cylindrical bundle 100. The recovery unit 500 is coupled to one end of the first connection pipe 400 of the circulation unit. An other end of the first connection pipe 400 is coupled with the circulation pump 410. Furthermore, the second connection pipe 420 is coupled to the circulation pump 410, where the second connection pipe 420 is also connected to the spray unit 210. Coating solution received in the recovery unit 500 is supplied by the operation of the circulation pump 410 to the spray unit 210 at a predetermined pressure via the first connection pipe 400 and the second connection pipe 420. In the case of the conventional spray method, after the coating solution is sprayed from the spray nozzle units 220 and used to coat the heat transfer tubes 105 within the cylindrical bundle 100, some remaining coating solution cannot be collected and reused. However, in the present disclosure, the remaining coating solution can be collected and reused by the recovery unit 500, the circulation pump 410, and the first and second connection pipes 400 and 420.

In an embodiment of the present disclosure, the first and second rotating units 300 and 300' are disposed under the cylindrical bundle 100 so as to support the cylindrical bundle 100 and rotate it in one direction. The first and second rotating units 300 and 300' rotate in the same direction, and enable the cylindrical bundle 100 supported thereon to rotate in one direction. Referring to FIG. 2, which shows a left side profile view of FIG. 1, the second rotating unit 300' and a third rotating unit 300" support a lower portion of the longitudinal opposite ends of the cylindrical bundle 100 on the left side. Likewise, the first rotating unit 300 and a fourth rotating unit 300''' (not shown) supports the lower portion of the longitudinal opposite ends of the right side of the cylindrical bundle 100. The rotating speed of the rotating units 300, 300', 300" and 300''' may range from 4 deg/min to 8 deg/min, but the present disclosure is not limited to this.

The system of coating the heat transfer tube for the condenser according to the present disclosure may further include a first movable rotating unit and a second movable rotating unit. The first and second movable rotating units will be described with reference to FIGS. 3 and 4.

Referring to FIG. 3, an embodiment of the system may further include the first movable rotating unit 310 and the second movable rotating unit 310' as well as including the first and second rotating units 300 and 300'. The first and second movable rotating units 310 and 310' are disposed between the first and second rotating units 300 and 300' and functions to support the cylindrical bundle 100 and rotate it in one direction. In detail, the first and second rotating units 300 and 300' may be stationary and cannot be moved in the vertical direction but can only rotate in the same direction, unlike the first and second movable rotating units 310 and 310'. The first rotating unit 300 and the second rotating unit 300' function to support the cylindrical bundle 100 and rotate it in the same direction. On the other hand, the first and second movable rotating units 310 and 310' are movable in the vertical direction, as shown in FIG. 4. When the first movable rotating unit 310 moves upward, the second movable rotating unit 310' does not separately move. The cylindrical bundle 100 is moved toward the second rotating unit 300' by the upward movement of the first movable rotating unit 310. Furthermore, when the first movable rotating unit 310 moves downward, the second movable rotating unit 310' moves upward in response to the movement of the first movable rotating unit 310. In this case, the cylindrical bundle 100 is moved toward the first rotating unit 300.

The cylindrical bundle 100 is moved toward the first rotating unit 300 or the second rotating unit 300' by the vertical movement of the first movable rotating unit 310 and the second movable rotating unit 310'. Thanks to this movement, coating solution sprayed onto the cylindrical bundle 100 can effectively flow into the cylindrical bundle 100, and the flow of coating solution is caused in the cylindrical bundle 100. As a result, the surfaces of the heat transfer tubes 105 disposed in an inner portion of the cylindrical bundle 100 can also be uniformly coated with coating solution. The first movable rotating unit 310 and the second movable rotating unit 310' can rotate at the same speed as that of the first and second rotating units 300 and 300'.

The first rotating unit 300, the second rotating unit 300', the first movable rotating unit 310, and the second movable rotating unit 310' are coupled to an actuator (not shown) provided to rotate or move the rotating unites. The rotation or movement by the operation of the actuator (not shown) can be realized by a known technique.

Example of Production Process

Production of Coating Solution for Heat Transfer Tube of Condenser

Coating solution was produced by mixing 1H, 1H, 2H, 2H-perfluorodecyltrichlorosilane and n-hexane at a ratio of 1:1000. A heat transfer tube for a condenser was coated with the coating solution using the coating system according to the present disclosure.

Embodiment

Checking Condensation Performance of Surface of Heat Transfer Tube

FIG. 5 shows a contact angle measured after the surface of the heat transfer tube of the condenser has been coated. The measured contact angle ranged from 155° to 163°. As a result of the measurement of the contact angle, it was determined that a super-hydrophobic surface was formed by coating the surface of the heat transfer tube. Referring to FIG. 6, it can be understood that super-hydrophobic coating was realized because it was additionally determined that water was not formed on the surface of the heat transfer tube.

As described above, a system for coating a heat transfer tube for a condenser according to the present disclosure can simplify a process of coating the heat transfer tube, and can uniformly coat a plurality of heat transfer tubes 105. In addition, the system is economically feasible in that coating solution can be reused by collecting and circulating it. Due to super-hydrophobic coating, the size of a droplet condensed on the surfaces of the heat transfer tubes 105 coated by the system can be reduced, and a condensation heat transfer coefficient can be increased.

While the present disclosure has been described with respect to the specific embodiments, it will be apparent to those skilled in the art that various changes and modifications may be made without departing from the spirit and scope of the disclosure as defined in the following claims.

What is claimed is:

1. A system for coating a plurality of heat transfer tubes for a condenser, the system comprising:
   at least one pair of stationary rotating units configured to rotate a cylindrical bundle in which the plurality of heat transfer tubes are arranged;
   a pair of movable rotating units disposed below the cylindrical bundle to support the cylindrical bundle from a lower side of the cylindrical bundle;
   a spray unit facing a circumference of the cylindrical bundle and configured to spray a coating solution onto respective surfaces of the plurality of heat transfer tubes;
   a recovery unit disposed under the cylindrical bundle and configured to collect the coating solution remaining after the coating solution is sprayed onto the surfaces of the plurality of heat transfer tubes and flows downward over the surfaces of the plurality of heat transfer tubes; and
   a circulation unit communicating with the recovery unit and configured to supply the collected coating solution to the spray unit.

2. The system according to claim 1, wherein each stationary rotating unit of the at least one pair of stationary rotating units is disposed below the cylindrical bundle to support the cylindrical bundle from the lower side of the cylindrical bundle.

3. The system according to claim 1, wherein the at least one pair of stationary rotating units includes a pair of stationary rotating units respectively disposed at longitudinally opposite ends of the cylindrical bundle.

4. The system according to claim 1, wherein each stationary rotating unit and each movable rotating unit is configured to rotate within a speed range of 4 deg/min to 8 deg/min.

5. The system according to claim 1, wherein the movable rotating units are disposed between the stationary rotating units of a pair of stationary rotating units.

6. The system according to claim 1, wherein the pair of movable rotating units is respectively disposed on opposite sides of the center of the cylindrical bundle.

7. The system according to claim 6, wherein each movable rotating unit is configured to move up, to push the cylindrical bundle higher against one stationary rotating unit of each pair of the at least one pair of stationary rotating units.

8. The system according to claim 7, wherein the cylindrical bundle pushed higher against one stationary rotating unit is moved with respect to the spray unit, so that the coating solution is sprayed onto the respective surfaces of the plurality of heat transfer tubes from one side of an apex of the cylindrical bundle.

9. The system according to claim 7, wherein each movable rotating unit is configured to move down, to lower the cylindrical bundle pushed higher against one stationary rotating unit, while the other movable rotating unit is moved up.

* * * * *